US 7,953,710 B2

(12) United States Patent
Novik et al.

(10) Patent No.: US 7,953,710 B2
(45) Date of Patent: May 31, 2011

(54) MULTI-MASTER DATABASE SYNCHRONIZATION WITHOUT LOSS OF CONVERGENCE

(75) Inventors: Lev Novik, Bellevue, WA (US); Yunxin Wu, Kirkland, WA (US); Irena Hudis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 294 days.

(21) Appl. No.: 11/474,245

(22) Filed: Jun. 23, 2006

(65) Prior Publication Data

US 2007/0299887 A1 Dec. 27, 2007

(51) Int. Cl.
*G06F 7/00* (2006.01)
(52) U.S. Cl. ........ 707/692; 707/662; 707/666; 707/695; 709/201
(58) Field of Classification Search .................. 707/692, 707/226, 666, 695; 709/201
See application file for complete search history.

(56) References Cited

U.S. PATENT DOCUMENTS

| | | | |
|---|---|---|---|
| 5,835,953 A | 11/1998 | Ohran | 711/162 |
| 5,924,096 A | 7/1999 | Draper et al. | 707/10 |
| 6,192,365 B1 | 2/2001 | Draper et al. | 707/101 |
| 6,343,299 B1 | 1/2002 | Huang et al. | 707/203 |
| 6,374,262 B1 | 4/2002 | Kodama | 707/201 |
| 6,446,091 B1 * | 9/2002 | Noren et al. | 707/202 |
| 6,574,591 B1 | 6/2003 | Kleiman et al. | 703/203 |
| 6,993,539 B2 | 1/2006 | Federwisch et al. | 707/201 |
| 7,007,003 B1 | 2/2006 | Rybicki | 707/1 |
| 7,007,046 B2 | 2/2006 | Manley et al. | 707/204 |
| 7,013,315 B1 | 3/2006 | Boothby | 707/203 |
| 2002/0156798 A1 * | 10/2002 | Larue et al. | 707/201 |
| 2002/0178146 A1 | 11/2002 | Akella et al. | 707/2 |
| 2003/0195899 A1 * | 10/2003 | Tsao | 707/104.1 |
| 2004/0193952 A1 | 9/2004 | Narayanan et al. | 714/13 |
| 2005/0027755 A1 * | 2/2005 | Shah et al. | 707/201 |
| 2007/0271317 A1 * | 11/2007 | Carmel | 707/204 |

FOREIGN PATENT DOCUMENTS

WO WO/2006/018843 * 2/2006

OTHER PUBLICATIONS

Cox, R., et al., "Optimistic replication using vector time pairs," http://pdos.csail.mit.edu/6.824-2004/papers/tra.dpf, downloaded from the Internet on or about Mar. 27, 2006, 1-16.
Ghemawat, S., et al., "The Google file system," *SOSP '03*, 2003, http://labs.google.com/papers/gfs-sosp2003.dpf, downloaded from the Internet on or about Mar. 27, 2006, 15 pages.
Kazar, M.L., "Synchronization and caching issues in the Andrew file system," *Information Technology Center, Carnegie-Mellon University*, CMU-ITC-88-063, http://reports-archive.adm.cs.cmu.edu/anon/itc/CMU-ITC-063.pdf, downloaded from the Internet on or about Mar. 27, 2006, 1-14.

* cited by examiner

*Primary Examiner* — Wilson Lee
*Assistant Examiner* — Tuan-Khanh Phan
(74) *Attorney, Agent, or Firm* — Woodcock Washburn LLP

(57) ABSTRACT

Tombstones can be removed from a data store without data corruption. Tombstones placed into a forgotten knowledge list can be compared against each other and/or items in a tombstone table, and deleted when tombstones representing subsequently deleted items are extant. Also, creation database version information can be kept along with database items, and databases can record database version information when they synchronize. If a synchronizing database discovers an item that it does not have, but the creation database version information associated with the item reflects that the synchronizing database "should" have the item, then it can be inferred that the item was subsequently deleted, and item resurrection can be prevented.

15 Claims, 4 Drawing Sheets

MULTI-MASTER DATABASE SYNCHRONIZATION WITHOUT LOSS OF CONVERGENCE

BACKGROUND

In many replicated data stores, for example in the WINDOWS® Filing System (WinFS) data store, metadata identifying stored items is kept after the items themselves are deleted. This metadata is referred to herein as a "tombstone." Keeping tombstones facilitates tracking deletion of items and propagating item deletion to other data stores through replication and synchronization processes.

WinFS uses a "tombstone table" in order to track deleted items. While the tombstone table generally serves its purpose, one problem is that over time the tombstone table can grow very large and clog the system. A tombstone is generated for each deleted item, and there is no mechanism for removing tombstones.

Removing tombstones would solve the problem of ever-expanding tombstone tables, but such removal is easier said than done. Removing tombstones is problematic in scenarios involving multi-master database synchronization.

For example, consider an item that is stored in a first database, and subsequently propagated to three other databases. The item is then deleted from the first database. A tombstone is placed the first database's tombstone table. However, the first database is not synchronized with the others for a long period of time, and a hypothetical automated process goes through and removes the tombstone, thinking the item is sufficiently old.

After the tombstone is deleted, the first database again synchronizes with the other databases. Recall that the other databases still contain the item which was deleted from the first database. However, the first database has no record that the item was deleted, and neither do the other databases. Thus, the item would be propagated back to the first database, thereby "resurrecting" the deleted item and causing data corruption.

The above described problem has a number of variations of various degrees of complexity, all of which ultimately result in unacceptable data corruption. There is a need in the industry for an effective way to clean-up tombstones in a setting involving multi-master database synchronization, without loss of convergence.

SUMMARY

Systems and methods are provided for multi-master database synchronization without loss of convergence. Using the systems and methods provided herein, tombstones can be removed from a data store, for example according to remaining space criteria or a retention time policy, without data corruption. In one aspect, tombstones can comprise version information that allows for keeping a "forgotten knowledge" list in addition to a tombstone table. Version information in the forgotten knowledge list can be compared against tombstones in the tombstone table, and tombstones representing subsequently deleted items can be deleted. In another aspect, creation database version information can be kept along with database items, and databases can record database version information when they synchronize. If a synchronizing database discovers an item that it does not have, but the creation database version information associated with the item reflects that the synchronizing database "should" have the item, then it can be inferred that the item was subsequently deleted, and item resurrection can be prevented. Additional aspects and advantages of the invention are discussed below.

BRIEF DESCRIPTION OF THE DRAWINGS

The systems and methods for multi-master database synchronization without loss of convergence in accordance with the present invention are further described with reference to the accompanying drawings in which.

DETAILED DESCRIPTION

Figure 1:
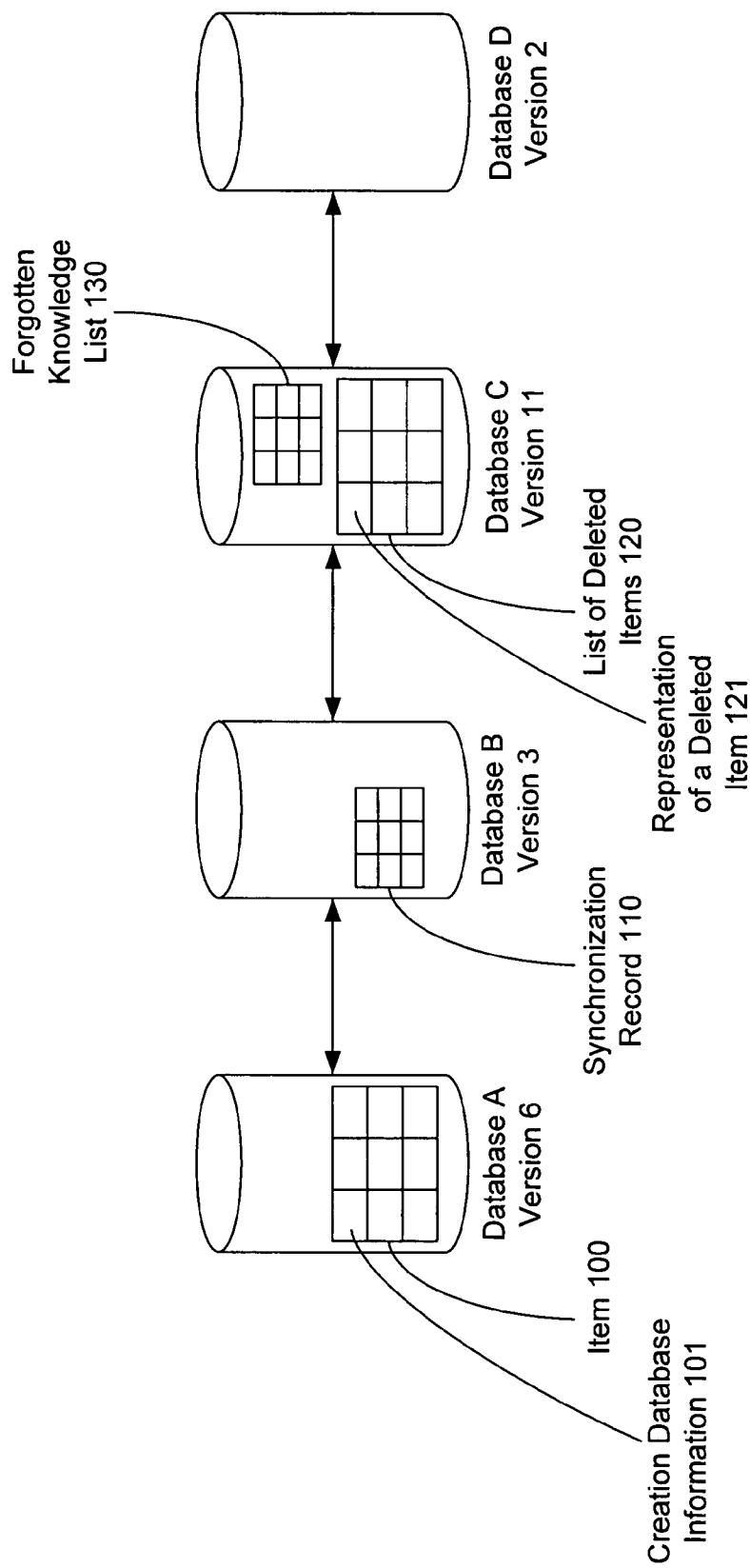
FIG. 1 illustrates a plurality of databases that may synchronize with one another, and which maintain information to allow cleanup of certain deleted information and maintenance of creation version information in accordance with the systems and methods set forth herein.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The following sections I-VI generally describe a variety of technical considerations associated with the invention. Further description for the purpose of elaborating on the claimed subject matter and providing description of the figures follows section VI, below.

I. Metadata Cleanup and Sync

A. Consequences of Metadata Cleanup

In order to maintain full convergence between replicas, all changes may be communicated between them. This includes item creation, update and deletion. Upon deletion, metadata of the deleted item may be stored as a tombstone. This is used to communicate the deletion to other replicas. The metadata identifies the deleted items, as well as information crucial to detect conflicts.

While the metadata pertaining to "live" (non-deleted) items may remain in the store throughout the lifetime of the items, in theory, metadata pertaining to deleted items is only needed until those changes have been communicated to other replicas.

In addition, while users are facilitated to control the amount of data they have in the store, the amount of information pertaining to deletes is hidden and counter-intuitive. Pathological cases of resources leaks due to multiple deletions over time may very well occur, and render the system unusable due to lack of storage space, taken by very large tombstones. Those cases are hard to detect and may be critical to the normal functioning of the system.

While synchronizing replicas frequently ensures maximum convergence, multi-master data store synchronization technologies should advantageously also support infrequent synchronization. The metadata cleanup mechanism is independent of synchronization, and it is a possibility that the changes covered by the cleanup occurred in a time that was not covered by sync. Therefore, the cleaned-up changes are "forgotten" and will not be communicated with other replicas. The consequence of forgotten changes can be divergence between replicas.

B. Fully vs. Partially Convergent Replica Membership

In fully-convergent replicas, the same membership state applies, i.e., all members present in replica A are also present in replica B and vice-versa.

In a partially convergent replica membership cases, we may see some items present in one replica and not in another. Thus, when an item is created or added to a replica, the intent is for that item to be replicated across. Similarly, an update or modification of an item is intended to be replicated.

The intent in deletion, however, is often different. It is mostly based on local space or organizational constraints and rarely on global requirement to remove the item from all replicas. Explicit removal of an item from all replicas may be requested for security reasons such as the urgent removal of an offensive item. This is, however, hardly a common case, and is often controlled from a central location rather than a synchronizing peer. Therefore, non propagation of a deletion is rarely mission critical and does not hinder functionality.

II. Fully-Convergent Solution

In one embodiment, in order to accommodate a fully-convergent set of replicas in the advent of metadata clean up, we keep track of the cleanup itself. In such an embodiment, the following conditions may be met:

1. Cleanup may be done in a chronological order, i.e. all changes from timestamp 0 to timestamp X.

2. Timestamp X, comprising, for example, a database identifier and a database version identifier, may persist in the replica as "forgotten knowledge".

The existence of "forgotten knowledge" is detected upon sync, and if the receiver's awareness is earlier to the timestamp of the cleanup, then the anomaly is detected. Refer to the "forgotten knowledge in detail" section for details on "forgotten knowledge".

In those cases, either a full re-init or content comparison (detection of missing items to determine deletes) may be needed to restore full convergence of the replicas. While this ensures full convergence, the full re-init or sending the complete list of item ID's may be a very timely operation due to the amount of data exchanged. There are several action paths in response to forgotten knowledge for fully convergent policies:

A. Fail Sync, Re-Nit at User's Request

This all-or-nothing approach has the advantage of user awareness and simplicity of implementation. It may, however, cause loss of changes in situations involving updates after the last sync.

B. Automatic Recovery

This solution comprises sending a list of item ID's and item creation versions, in addition to replica's knowledge, in order to detect deletes on the other replica. Refer to the "using creation version to detect deleted items" section for details on how they are used to get the replicas back to convergence. Embodiments of this solution may implement batching of large numbers of item ID's, and may conduct several round-trips between the replicas.

III. Partially-Convergent Solution

The propagation of deletes is rarely considered mission critical. With this assumption, several potential implementations may be examined:

A. Divergence Detected, Update of Remotely Deleted Items Treated as Update/Delete Conflict In one embodiment, divergence can be detected using forgotten knowledge. User may be aware some of the items in his or her replica no longer exist remotely. When update is performed on such items, conflict may occur on the receiving replica. This is because forgotten knowledge from the sending replica cannot pinpoint which item at the receiving replica no longer exists remotely. Such conflicts can be detected in two ways.

First, when an update is propagated to a replica that has deleted an item, creation version information can be sent along with the change. The creation version information can be compared against the replica's sync record. If the creation version is covered in the sync record, and the item does not exist, we know that there has been a remote update and local delete conflict. This is true whether or not a tombstone exists for the item.

In automatic recovery described earlier and in section V, below, if the item has been detected as being deleted at a remote replica, we can check the local version of the item against the sync record of the remote replica, if it is not covered, we know that there has been a local update on the item after the last sync, and we should report a local update and remote delete conflict. Both of these conflict detection techniques also apply to section V, below.

B. Divergence Not Detected.

In another embodiment, no forgotten knowledge is recorded. However, forgotten/update conflicts may still occur as above.

IV. Forgotten Knowledge in Detail

A. Updating Forgotten Knowledge

Forgotten knowledge may be updated, for example, in the following two situations:

1. When Tombstones Were Cleaned Up

In one embodiment, for each distinct partner in the versions of tombstones to be cleaned up, select the version with largest change number. The list of those versions forms a knowledge instance. It is then merged with existing forgotten knowledge to get the new forgotten knowledge.

For example, a merge of a knowledge instance (e.g. Knowledge 1) with existing forgotten knowledge (e.g. Knowledge 2) to get a new forgotten knowledge can proceed as follows:

Knowledge 1=A15 B10

Knowledge 2=A10 B15

The merge yields: A15 B15

2. When Performing a Sync

In another embodiment, the forgotten knowledge of the sending replica can be merged into the forgotten knowledge of the receiving replica to obtain the new forgotten knowledge for the receiving replica.

B. Detection of Out of Convergence

In one embodiment, at the beginning of sync session, the sender's forgotten knowledge may be compared with receiver's local knowledge. If the receiver's local knowledge does not fully subsume the sender's forgotten knowledge, out of convergence can be reported.

V. Using Creation Version to Detect Deleted Items

For a local item at the receiving replica that is not in the item ID list from the sending replica, there are two possibilities:

1. That item has been deleted at the sending replica, and the tombstone of that item has been cleaned up and never been received.

2. That item is newly created at the receiving replica and has never been synced to the sending replica.

For case 1, we can delete the item, but for case 2, it is desirable to keep the item. To distinguish the two, the creation version can be compared with the knowledge of the sender, if it is covered, we know that the sender has seen the creation of the item, i.e., it is case 1. Otherwise, it is case 2.

VI. Related Issues

A. ID Mapping

Cleaning up the tombstones may cause some orphaned items in the remote ID map. A variety of solutions may be used to address this situation. For example, in one embodiment, a query can be periodically run for orphaned items in the ID map, and the orphaned items may be removed. In another embodiment, a program module that cleans up a tombstone may call a sync program module upon item removal from tombstone, within the same transaction with item ID. This operation may be batched. In another embodiment, a wrap-around sync program module may be used that accepts database version information for cleanup. In another embodiment, a program module that cleans up a tombstone can create a clean up log with item ID's.

B. Item Resurrection

See section pertaining to partially-convergent solutions.

C. "Safe Retention Period"

In order to reduce the occurrences of excessive tombstone cleanup, a minimum retention period during which no cleanup can be performed may be defined, so that users have a guideline of the maximum safe offline period. Such period may be hard-coded or configurable.

Further Description of Illustrative Embodiments

This section further elaborates various aspects of the invention and provides support for the various elements illustrated in the figures as well as the language of the claims.

FIG. 1 illustrates a plurality of data stores, including Database A, Database B, Database C, and Database D. The terms "data store" and "database" are used interchangeably herein to refer to a computer or component of a computer in which data is stored. Each database in FIG. 1 can be said to have a database identifier. Here, the identifier for Database A is "A," the identifier for Database B is "B," and so forth. Each database in FIG. 1 is also associated with a database version identifier. Database A is associated with database version identifier "6," Database B is associated with database version identifier "3," Database C is associated with database version identifier "11," and Database D is associated with database version identifier "2." A database changes when data within it changes, and therefore database version identifiers may be used to indicate a particular point in time or state of data associated with a database. For example, Database A, version 6 may be a database that is somewhat different from Database A, version 7.

The various databases in FIG. 1 are arranged to engage in multi-master synchronization. No single database necessarily contains the "true" data. Instead, data may be created, added, modified, or deleted from any of the databases, and such developments will be propagated to the other databases if and when a synchronization is performed. The synchronizability of the databases is indicated by the two-way arrows between the databases. For the purpose of this illustration, assume any database in FIG. 1 can synchronize with any of the other databases, although such an arrangement is not required as a setting in which the invention may be practiced.

The term "item" is used herein to refer to any data that may be stored in a database. There is an infinite variety of such data, for example, integers, strings, images, tables, videos, and text files, to name just a few. Database A shows an exemplary generic "item" 100 stored therein. In accordance with one aspect of the invention, item 100 may be associated with creation database information 101. Creation database information 101 comprises the database identifier and the database version identifier for the database in which the item 100 was created. In this case, assuming item 100 was created in Database A, version 6, creation database information could be A6. This information could be stored with item 100, for example, as part of item 100, or could be otherwise associated with item 100, in such a way that a database can discover what the creation database information is for item 100. Similarly, item 100 may be assigned a unique item identifier for the purpose of uniquely identifying the item 100.

In another aspect of the invention, a database, e.g., Database B, may comprise a synchronization record 110. A synchronization record 110 identifies the various databases and database versions that a particular database has synchronized with. For example, if Database B had synchronized with Database A, versions 1, 4, 5, and 6, then the synchronization record might comprise the appropriate database identifiers and database version identifiers as follows: A1, A4, A5, A6. Such data may of course be kept in a variety of ways.

In another aspect of the invention, a database may keep a list of deleted items 120, e.g., a tombstone table, and a forgotten knowledge list 130. A tombstone table 120 comprises metadata that identifies deleted items. For example, table 120 could comprise a list of item identifiers. Forgotten knowledge list 130 may also comprise such metadata, for example, item identifiers. Forgotten knowledge list 130 may also be expressed as a version vector, for example, A10, B15, without any item identifiers. Table 120 and list 130 may further comprise information similar to that stored in the synchronization record 110. That is, table 120 and list 130 may keep a database identifier and database version identifier along with each item identifier.

Keeping creation database information, synchronization information, and a forgotten knowledge list, as provided above, can facilitate multi-master synchronization, prevent loss of convergence, and allow for tombstone cleanup, as will be described below. "Tombstone cleanup" refers to the removing of at least one representation of a deleted item from a list of deleted items such as 120.

Figure 2:
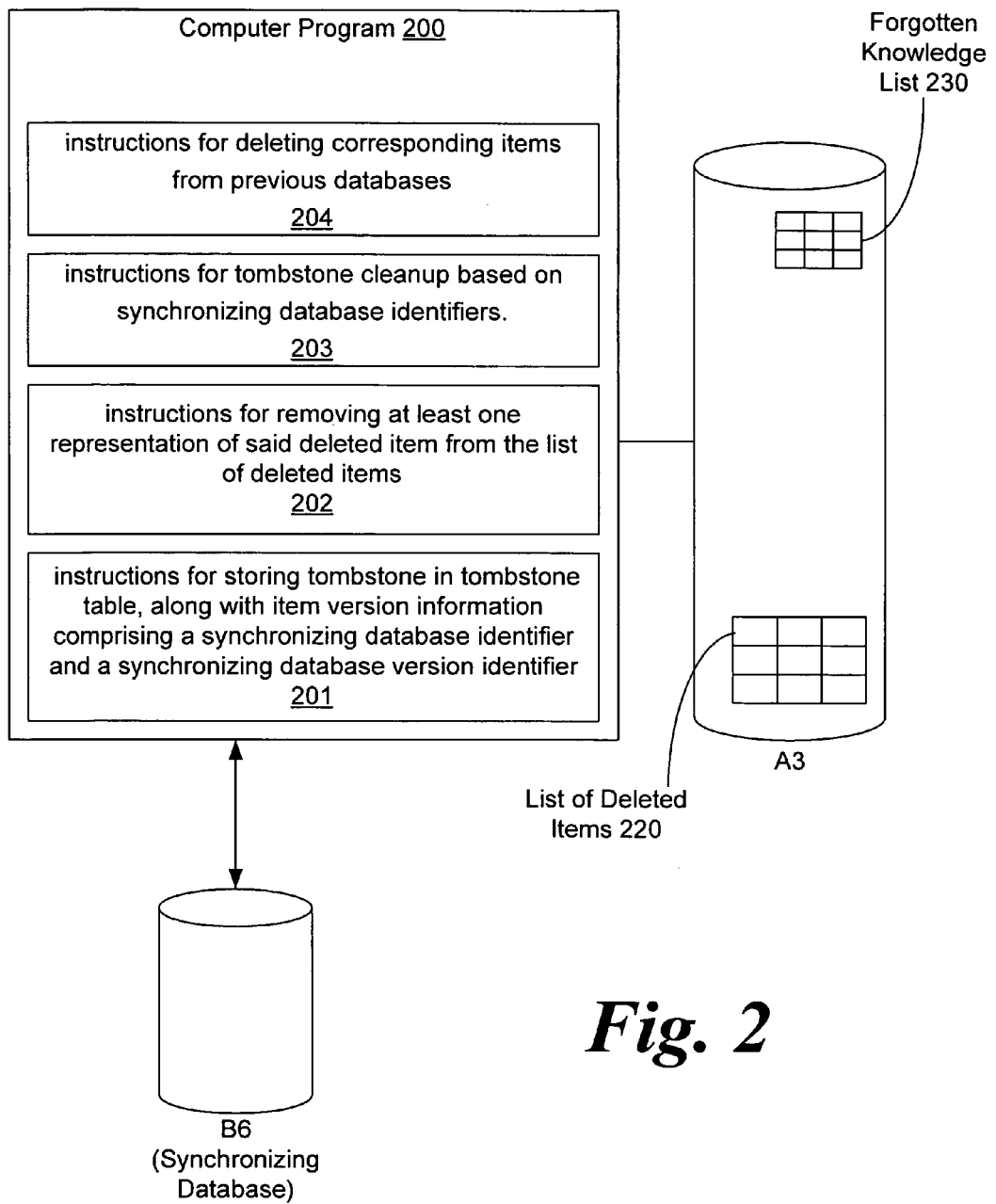
FIG. 2 illustrates computer program 200 for synchronizing data in a database.

FIG. 2 illustrates a computer program 200 for synchronizing data in a database A3 (Database A, version 3), said computer program 200 comprising instructions 201 for storing a representation of a deleted item in a list of deleted items, wherein said representation comprises item version information, said item version information comprising a synchronizing database identifier and a synchronizing database version identifier. Here, the synchronizing database identifier and a synchronizing database version identifier could be, for example, B6.

Computer program 200 may further comprise instructions for tombstone cleanup 202. Such instructions 202 comprise instructions for removing at least one representation of a deleted item from said list of deleted items 220. Instructions for tombstone cleanup 202 may comprise, for example, instructions for removing tombstones from 220 according to remaining space criteria or a retention time policy. Instructions 202 should also include, or otherwise operate in conjunction with, instructions 203 for tombstone cleanup based on synchronizing database identifiers.

Instructions 203 for tombstone cleanup based on synchronizing database identifiers leverage the database identifiers and database version identifiers to determine which tombstones can be deleted. For example, many versions of a synchronizing database B are represented in 220, e.g. B1, B3, B4, and B6, tombstones that are flagged with previous synchronizing database identifiers and a synchronizing database version identifiers can be cleaned up, so long as it is ensured that information is retained regarding a subsequent version of the synchronizing database. Thus, instructions 203 may comprise instructions for ensuring that at least one representation of a deleted item is retained, wherein a retained representation of said deleted item comprises item version information with a subsequent version as compared to a removed representation of said deleted item. Forgotten knowledge list 230 can maintain data representing the database identifiers and a synchronizing database version identifiers that are at the "cutoff point" in that deleted item information from previous databases is no longer available.

In one embodiment, instructions 203 may place a retained representation of a deleted item in the forgotten knowledge list 230. The forgotten knowledge list 230 may comprise representations of just one version of those deleted items in the forgotten knowledge list 230. Representations associated with previously synchronizing databases may be overwritten—thereby overwriting an existing representation of a deleted item in said forgotten knowledge list with said retained representation. The representations of just one version of those deleted items in said forgotten knowledge list may be representations of versions of those deleted items which are subsequent to all removed representations of those deleted items. In another embodiment, only information about synchronizing databases need be kept in the list 230.

In one embodiment, computer program 200 may further comprise instructions 204 for comparing a retained representation to a representation of a corresponding item in another database, and deleting said corresponding item if it is determined that said corresponding item is a version of said deleted item that is previous to said retained representation. Creation database information may also be utilized in the implementation of FIG. 2 as will be discussed further below.

Figure 3:
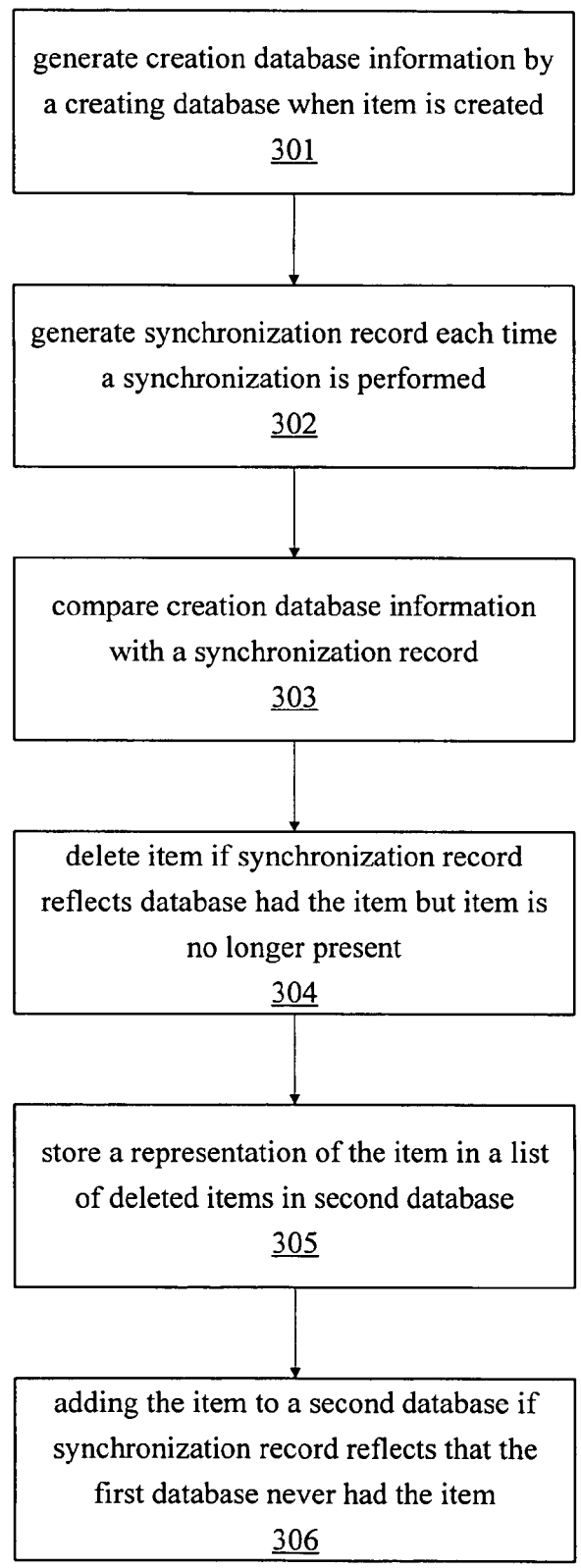
FIG. 3 illustrates a method for synchronizing a plurality of databases.

FIG. 3 illustrates a method for synchronizing a plurality of databases. Here, creation database information may be kept as discussed with reference to FIG. 1. In the illustrated embodiment, creation database information may be generated by a creating database when an item is created 301. A synchronization record may be generated each time a synchronization is performed 302. Creation database information may be compared with a synchronization record 303. The item can be deleted 304 if the synchronization record reflects that a first database had the item but said item is no longer present in said first database. If the item is deleted, a representation of the item can be stored in a list of deleted items 205. Otherwise, the item can be added to a second database if said synchronization record reflects that the first database never had the item 206.

Figure 4:
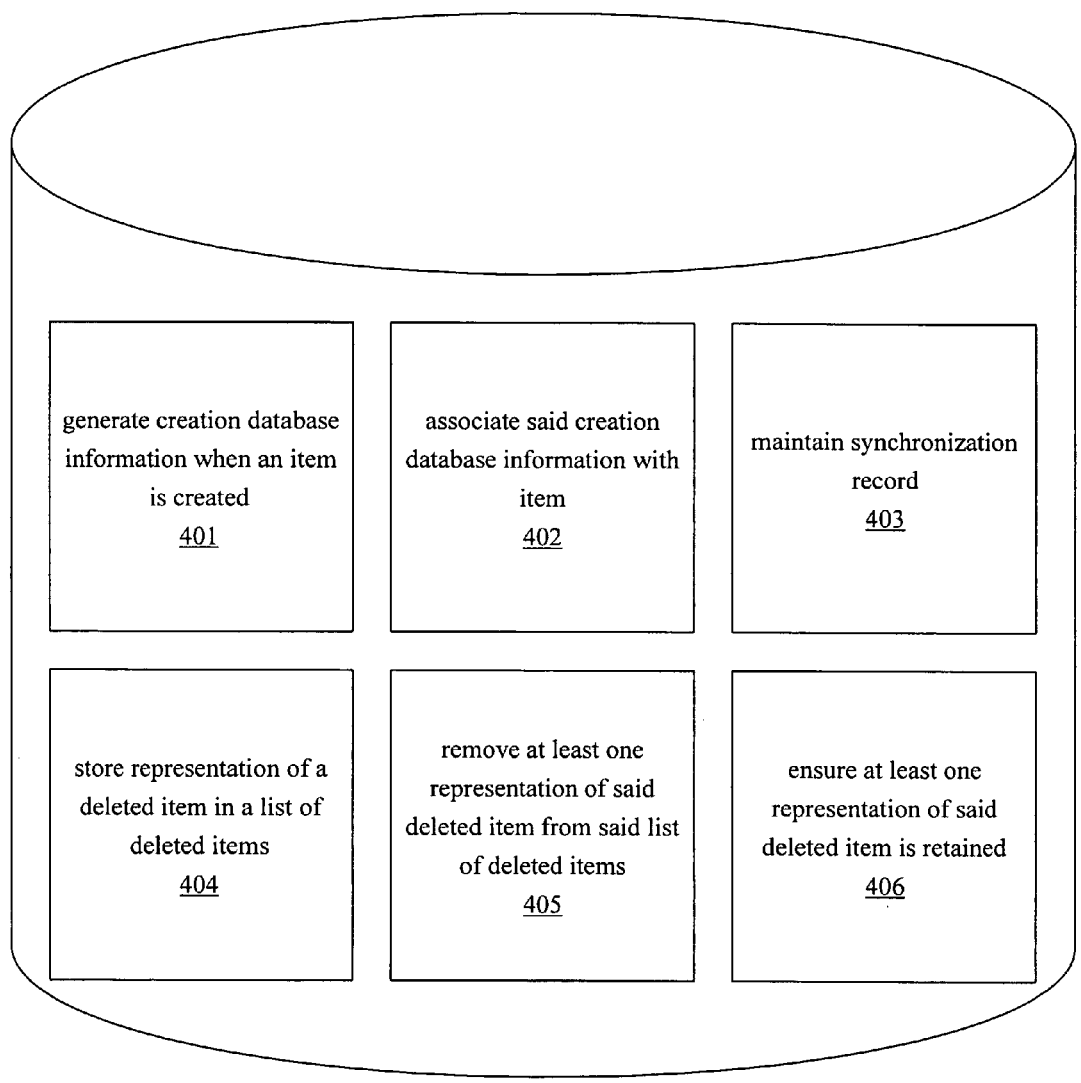
FIG. 4 illustrates a database 400 comprising software for supporting synchronization with other databases.

FIG. 4 illustrates a database 400 comprising software for supporting synchronization with other databases, the software comprising a plurality of computer readable instructions, such as instructions 401 for generating creation database information when an item is created. As discussed above, creation database information comprises a creation database identifier and a creation database version identifier. Instructions 402 for associating said creation database information with said item may also be included, as may instructions 403 for maintaining a synchronization record. The synchronization record comprises a synchronizing database identifier and a synchronizing database version identifier for any synchronizing database with which said database 400 has synchronized.

Database 400 may also include instructions 404 for storing a representation of a deleted item in a list of deleted items, instructions 405 for removing at least one representation of said deleted item from said list of deleted items, and instructions 406 for ensuring that at least one representation of said deleted item is retained, wherein a retained representation of said deleted item comprises item version information with a subsequent version as compared to a removed representation of said deleted item.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

The invention claimed is:

1. A system having a computer storing program code, said program code comprising:
   instructions for storing in a first database, a tombstone representation of a deleted item in a list of deleted items for items deleted from the first database, wherein said representation of said deleted item comprises item version information, said item version information comprising synchronizing database information including a synchronizing database identifier and a synchronizing database version identifier which respectively indicate an identity and version of a second database that the first database has synchronized with, wherein a database version identifier of a database indicates a point in time or state of stored data associated with that database;
   instructions for removing at least one representation of said deleted item from said list of deleted items in said first database;
   instructions for ensuring that at least one representation of said deleted item is retained such that a retained representation of said deleted item comprises item version information associated with a synchronizing database version identifier of the second database which is subsequent to the synchronizing database version identifier of the second database associated with a removed representation of said deleted item, and wherein:
   said instructions for storing a representation of a deleted item further comprise instructions for storing a creation database identifier and a creation database version identifier of said deleted item; and
   said instructions for ensuring that at least one representation of said deleted item is retained overwrite an existing representation of a deleted item in a forgotten knowledge list with said retained representation.

2. The system of claim 1, wherein said instructions for ensuring that at least one representation of said deleted item is retained places said retained representation in the forgotten knowledge list.

3. The system of claim 2, wherein said at least one representation of said deleted item is a version of said deleted item which is subsequent to all removed representations of said deleted items.

4. The system of claim 1, further comprising instructions for comparing said retained representation to a representation of a corresponding item in another database.

5. The system of claim 4, further comprising instructions for deleting said corresponding item if it is determined that said corresponding item is a version of said deleted item that is previous to said retained representation.

6. A method for synchronizing a plurality of databases, the method comprising:
   storing in a first database, a tombstone representation of a deleted item in a list of deleted items for items deleted from the first database, wherein said representation of said deleted item comprises item version information, said item version information comprising synchronizing database information including a synchronizing database identifier and a synchronizing database version identifier which respectively indicate an identity and version of a second database that the first database has synchronized with, wherein a database version identifier of a database indicates a point in time or state of stored data associated with that database;

removing at least one representation of said deleted item from said list of deleted items in said first database; and ensuring that at least one representation of said deleted item is retained such that a retained representation of said deleted item comprises item version information associated with a synchronizing database version identifier of the second database which is subsequent to the synchronizing database version identifier of the second database associated with a removed representation of said deleted item, wherein:

storing a representation of a deleted item further comprises storing a creation database identifier and a creation database version identifier of said deleted item; and ensuring that at least one representation of said deleted item is retained overwrite an existing representation of a deleted item in said forgotten knowledge list with said retained representation.

7. The method of claim 6, wherein ensuring that at least one representation of said deleted item is retained places said retained representation in the forgotten knowledge list.

8. The method of claim 7, wherein said at least one representation of said deleted item is a version of said deleted item which is subsequent to all removed representations of said deleted items.

9. The method of claim 6, further comprising comparing said retained representation to a representation of a corresponding item in another database.

10. The method of claim 6, further comprising deleting said corresponding item if it is determined that said corresponding item is a version of said deleted item that is previous to said retained representation.

11. A computer comprising storage device having stored thereon code for supporting synchronization with other databases, the code comprising:

computer executable instructions for storing in a first database, a tombstone representation of a deleted item in a list of deleted items for items deleted from the first database, wherein said representation of said deleted item comprises item version information, said item version information comprising synchronizing database information including a synchronizing database identifier and a synchronizing database version identifier which respectively indicate an identity and version of a second database that the first database has synchronized with, wherein a database version identifier of a database indicates a point in time or state of stored data associated with that database;

computer executable instructions for removing at least one representation of said deleted item from said list of deleted items in said first database; and computer executable instructions for ensuring that at least one representation of said deleted item is retained such that a retained representation of said deleted item comprises item version information associated with a synchronizing database version identifier of the second database which is subsequent to the synchronizing database version identifier of the second database associated with a removed representation of said deleted item, wherein:

said instructions for storing a representation of a deleted item further comprise instructions for storing a creation database identifier and a creation database version identifier of said deleted item; and said instructions for ensuring that at least one representation of said deleted item is retained overwrite an existing representation of a deleted item in a forgotten knowledge list with said retained representation.

12. The computer of claim 11, wherein said instructions for ensuring that at least one representation of said deleted item is retained places said retained representation in the forgotten knowledge list.

13. The computer of claim 12, wherein said at least one representation of said deleted item is a version of said deleted item which is subsequent to all removed representations of said deleted items.

14. The computer of claim 13, said database further comprising computer executable instructions for comparing said retained representation to a representation of a corresponding item in another database.

15. The computer of claim 11, said database further comprising computer executable instructions for deleting said corresponding item if it is determined that said corresponding item is a version of said deleted item that is previous to said retained representation.

* * * * *